(12) United States Patent
Maier

(10) Patent No.: US 7,961,939 B2
(45) Date of Patent: Jun. 14, 2011

(54) COLOR TRANSFORMING METHOD

(75) Inventor: Thomas O. Maier, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 943 days.

(21) Appl. No.: 11/853,214

(22) Filed: Sep. 11, 2007

(65) Prior Publication Data

US 2009/0067708 A1 Mar. 12, 2009

(51) Int. Cl.
*G06K 9/00* (2006.01)
(52) U.S. Cl. .......................................... 382/162; 382/167
(58) Field of Classification Search .................. 382/162, 382/167, 111; 345/696, 690; 315/169.3, 315/169.1, 292
See application file for complete search history.

(56) References Cited

U.S. PATENT DOCUMENTS

| | | | |
|---|---|---|---|
| 5,426,517 A | 6/1995 | Schwartz | |
| 5,754,682 A | 5/1998 | Katoh | |
| 5,966,454 A * | 10/1999 | Thomas et al. | 382/111 |
| 6,005,969 A * | 12/1999 | Thomas et al. | 382/162 |
| 6,101,272 A | 8/2000 | Noguchi | |
| 7,102,648 B1 * | 9/2006 | Holub | 345/589 |
| 7,710,433 B2 * | 5/2010 | Holub | 345/589 |
| 2003/0117413 A1 | 6/2003 | Matsuda | |
| 2005/0163370 A1 | 7/2005 | Minakuti et al. | |
| 2005/0169519 A1 | 8/2005 | Minakuti et al. | |

FOREIGN PATENT DOCUMENTS

| | | |
|---|---|---|
| EP | 0579224 B1 | 11/1998 |
| EP | 0 975 150 | 1/2000 |
| EP | 1558020 A2 | 7/2005 |
| EP | 1558022 A2 | 7/2005 |
| JP | 2006-78794 | 3/2006 |
| WO | WO2006/059282 | 6/2006 |

OTHER PUBLICATIONS

SMPTE proposed standard RP 431-2-2007 entitled Reference Projector and Environment for Display of DCDM in Review Rooms and Theatres, pp. 1-14.
R. W. Pridmore, "Effects of Luminance, Wavelength and Purity on the Color Attributes: Brief Review with New Data and Perspectives", Color Research and Application, vol. 32, No. 3, Jun. 2007, pp. 208-222.
R. W. G. Hunt—Ref 1: The Reproduction of Colour—*31.13.2 Correlate of Colourfulness*, $M_{94}$, pp. 737 and 738, unknown date.
Edward J. Giorgianni and Thomas E. Madden, Digital Color Management, Encoding Solutions—p. 541, unknown date.
R. W. G. Hunt—Ref 2: Light and Dark Adaptation and the Perception of Color, *Journal of the Optical Society of America*, vol. 42, No. 3, Mar. 1952, pp. 190-199.
R. W. G. Hunt—Ref. 3: The Perception of Color in 1° Fields for Different States of Adaptation, *Journal of the Optical Society of America*, vol. 43, No. 6, Jun. 1953, pp. 479-484.

(Continued)

*Primary Examiner* — Anh Hong Do
(74) *Attorney, Agent, or Firm* — Peyton C. Watkins; Kevin E. Spaulding

(57) ABSTRACT

A method for modifying original display device pixel values for a display device to maintain colorfulness, the method comprises the steps of obtaining original display device pixel values of an image; measuring white luminance from a viewing surface; and maintaining the colorfulness by calculating new pixel values based on the original display device pixel values, the measured luminance and a standard white luminance.

21 Claims, 3 Drawing Sheets

OTHER PUBLICATIONS

R. W. G. Hunt—Ref. 4: The Specification of Colour Appearance. I. Concepts and Terms, *Color research and application*, vol. 2, No. 2, Summer 1977, pp. 55-68.

R. W. G. Hunt—Ref 5: The Specification of Colour Appearance. II. Effects of Changes in Viewing Conditions, *Color research and application*, vol. 2, No. 3, Fall 1977, pp. 109-120.

SMPTE Standard—SMPTE 428-1-2006—D-Cinema Distribution Master—*Image Characteristics*, Approved Sep. 29, 2006, eight (8) pages total.

SMPTE Standard—SMPTE 431-1-2006—for D-Cinema Quality—*Screen Luminance Level, Chromaticity and Uniformity*, Approved Apr. 18, 2006, five (5) pages total.

Proposed SMPTE Recommended Practice for Digital Cinema, Date: Feb. 8, 2007—SMPTE 431-2—D-Cinema Quality—Reference Projector and Environment.—SMPTE Technology Committee DC28.30 on Digital Cinema Exhibition, pp. i-v and 1-12.

CIE Technical Report (ISBN 3 901 906 33 9)—Colorimetry, CVIE 15:2004, 3rd Edition.

\* cited by examiner

COLOR TRANSFORMING METHOD

FIELD OF THE INVENTION

This invention relates to an image processing method for modifying the code values of an image that will be output on an electronic output device, such as a digital projector, so that colorfulness is maintained.

BACKGROUND OF THE INVENTION

In motion picture production, even though the bulk of image capture is done on film media, a considerable amount of editing and post-production work is carried out using digital image manipulation tools, a process known as the digital intermediate process. During this digital intermediate process, a key process in preparing a motion picture production, images obtained during filming or generated digitally are displayed on a display device, a specific example of which is an electronic projector. In order for the display device to display the image, the display device image data must be sent to the display device. This display device image data is a set of code values that define the color to be displayed at each pixel. Based on these code values, the display device emits light that produces the proper color on the viewing screen. It is noted that because the digital intermediate process involves modifying the image so that the intent of the creative person can be shown, the display device image data may have no direct relationship to the film image and no direct relationship to the original scene. In the case of computer-generated imagery, such as cartoons, there never was an original scene. The final approval of the motion picture may be made by viewing a projected film print or by viewing the motion picture projected with an electronic projector. The motion picture shown to the paying public is now commonly projected using either a film projector with a film print of the motion picture or an electronic projector with a digital version of the motion picture.

When images are projected in a dark theater, people adapt to the overall luminance of the light reflected from the screen. After adaptation, it is impossible for a person to accurately estimate the luminance of a projected white patch. This is the reason that projected images can look real even though the luminance on the screen is a small percentage of the luminance of the original scene. For example, a white object in direct sunlight may have a luminance of 5000 nits and a black object in the same scene may have a luminance of 50 nits. A white object in a motion picture projected in a dark theater may have a luminance of 50 nits and a black object in the same scene may have a luminance of 0.025 nits. But both white objects will be judged to be white and both black objects will be judged to be black by observers adapted to those viewing conditions. Because of luminance adaptation, a person cannot judge the overall luminance of a scene or an object.

A visual phenomenon to which people do not adapt well is colorfulness. Colorfulness is defined herein using the definition from *Digital Color Management Encoding Solutions* by Giorgianni and Madden, page 541, "Colorfulness—Attribute of a visual sensation according to which an area appears to exhibit more or less of its hue." The same object, for example a piece of clothing, will appear very colorful when in direct sunlight, will appear considerably less colorful when in the shade or on a cloudy day, and even less colorful when indoors in a dimly lit room, and will appear to have no colorfulness if viewed when illuminated by starlight only. This phenomenon has been described in detail by Hunt in the articles R. W. G. Hunt, *Journal of the Optical Society of America*, 42, 190-199 (1952); R. W. G. Hunt, *Journal of the Optical Society of America*, 43, 479-484 (1953); R. W. G. Hunt, *Color Research and Application*, 2, 55-68 (1977); and R. W. G. Hunt, *Color Research and Application*, 2, 109-120 (1977). People tend to remember and prefer the high level of colorfulness that is associated with high levels of luminance such as outdoor sunlight conditions. The decrease in colorfulness due to a decrease in the luminance of the object is generally not preferred and is considered inferior to the sunlight conditions. Likewise, a motion picture that was created by viewing the images at a certain luminance level will look inferior if the motion picture is projected at a lower luminance level, not because the change in luminance is so visible, because it is not, but because the loss in colorfulness is visible when the luminance is decreased.

So that the paying public can see very high quality motion pictures independent of the theater that is entered and so that the creators of the motion pictures can be assured that the paying public is seeing their art displayed as they intended the images to be seen, the Society of Motion Picture and Television (SMPTE) has written standards and recommended practices that define the viewing conditions for viewing motion pictures in a dark theater. One such standard is SMPTE 431-1, which defines the white luminance that is to be measured off the screen in a dark theater when the screen is illuminated by an electronic projector. This white luminance is standardized to be 48 nits. However, due to decreased light output from a projector bulb as the bulb ages, it is common for the white luminance reflected from the screen to be below the standardized 48nits. In this case, the paying public may not notice the decrease in luminance, but they will see an inferior image due to the loss in colorfulness of all colored objects in the motion picture. Accordingly, it would be advantageous if when the white luminance is low, the low colorfulness of the colored objects in the motion picture could be brought back to the same colorfulness as when the motion picture was projected at the standardized white luminance. Alternatively, instead of bringing the colorfulness back to the colorfulness with the standardized white luminance, the colorfulness could be altered toward the colorfulness with the standardized white luminance even if it is not brought back completely to the colorfulness with the standardized white luminance. This will still give an improved or higher quality image relative to no change in colorfulness.

SUMMARY OF THE INVENTION

The aforementioned need is addressed according to the present invention by providing a means for adjusting the colorfulness of a displayed image using an electronic display device in its intended environment. Even in the case in which the white luminance in the theater is lower than the white luminance specified by the standard, the present invention describes how to restore the colorfulness of the displayed image.

The following steps summarize the present invention. The original code values of the image pixels, which are intended to be displayed with an electronic display device, are modified as follows. The luminance of a white patch displayed by the electronic display device is measured from the screen. The luminance can be measured with any device that will measure the absolute luminance, such as a light meter. This measurement is well known in the industry because this is the common method by which a display device is calibrated at the time of setting the device up in a theater. An algorithm is defined based on the relationship between the measured white luminance and the standardized white luminance. The algorithm may be stored in memory. The calculated algorithm is applied to the original display device image data to produce modified display device image data. The electronic display device displays an image based on the modified image data.

DETAILED DESCRIPTION OF THE INVENTION

Figure 1:
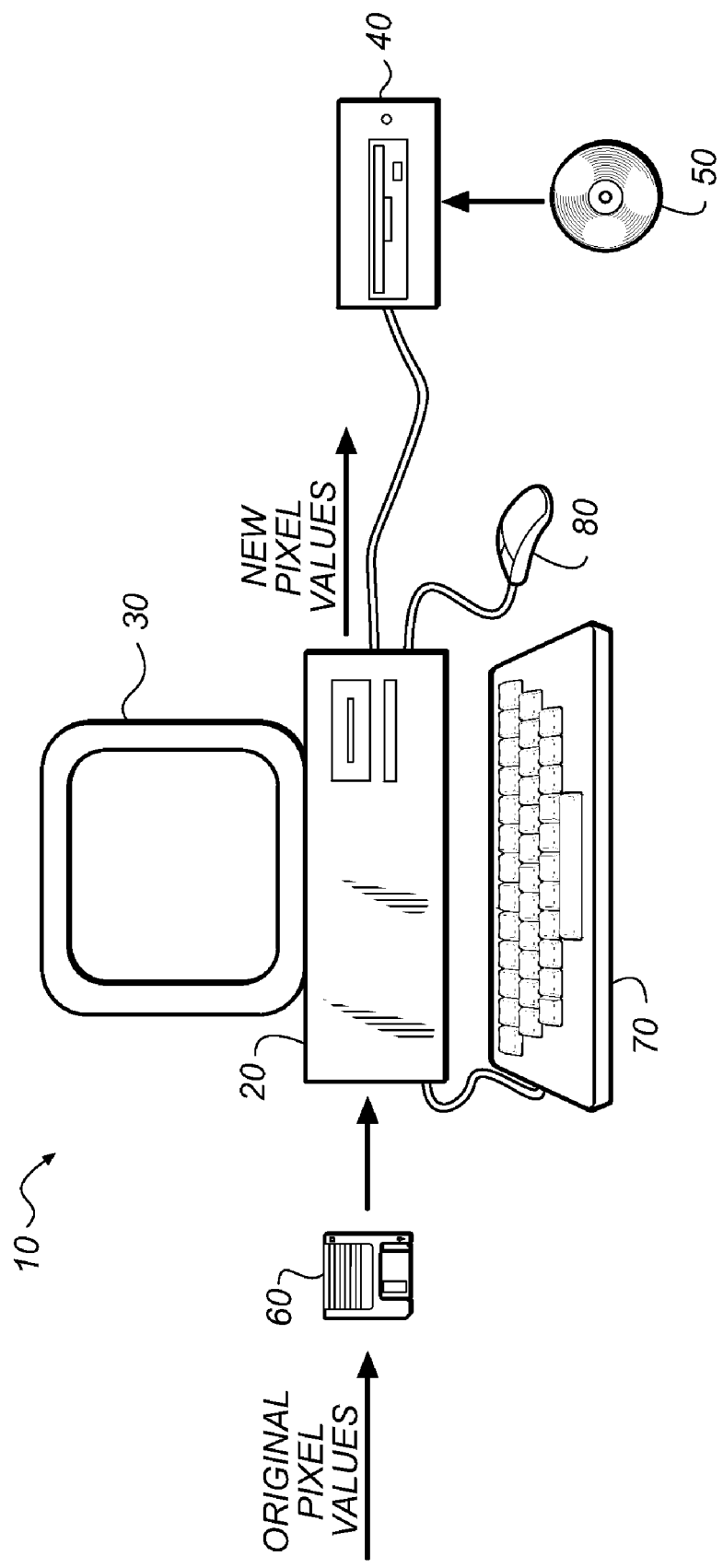
FIG. 1 illustrates a computer system for implementing the present invention.

The problem to be solved by the present invention is to transform original display device image data, which define an output image and which are intended to be displayed using an electronic output device operating at a standardized white luminance, such that when the transformed image data is projected using an electronic display device that has a white luminance different from the standard white luminance, the colorfulness of the projected transformed image data is closer to the colorfulness of the original display device image data projected with an electronic projection device operating at the standard white luminance than if no transform had been done.

The present invention will be described in detail with reference to the projection of motion picture images in a dark theater using an electronic projection device. However, it will be realized by one skilled in the art that this same technique could be applied to any electronic display device that displays images.

SMPTE Standard 428-1 defines the encoding of a digital image that will be sent to a digital projector for projection in a dark theater. Each pixel of an image is defined by three code values, labeled X', Y', and Z'. Pixel values such as these, which are intended to be sent to a display device, are referred to herein as "original display device pixel values". Because the colorimetry of the pixel is intended to match the CIE tristimulus values XYZ, the equations relating the XYZ values and the X'Y'Z' values are $$X' = \text{INT}\left(4095 * \left(\frac{48*X}{52.37}\right)^{1/2.6}\right) \quad (1)$$

$$Y' = \text{INT}\left(4095 * \left(\frac{48*Y}{52.37}\right)^{1/2.6}\right) \quad (2)$$

$$Z' = \text{INT}\left(4095 * \left(\frac{48*Z}{52.37}\right)^{1/2.6}\right) \quad (3)$$

where INT means to round the number down to the nearest integer if the fractional part is less than 0.5 and up to the nearest integer if the fractional part is 0.5 or greater. XYZ values and their calculation are defined in the publication CIE 15:2004. CIE stands for "Commission Internationale de l'Eclairage". By the definition of the CIE, the CIE Y value is called luminance. The use of the word luminance herein means the CIE Y value. The luminance can be either absolute or relative. In Equations 1-3, the Y value is scaled to the relative range from 0 to 1 and the X and Z values are scaled with the same scale factor as was applied to the Y value. To convert the Y values from the relative range of 0 to 1 to absolute values, one needs to multiply the XYZ values by 48 so that the range of Y values is 0 to 48. The 48 will now exactly match the SMPTE 431-1 standardized white luminance of 48 nits. The standardized white luminance is referred to herein using the symbol Ls.

SMPTE Recommended Practice 431-2 defines the inverse equations, X'Y'Z' to XYZ $$X = \left(\frac{52.37}{48}\right) * \left(\frac{X'}{4095}\right)^{2.6} \quad (4)$$

$$Y = \left(\frac{52.37}{48}\right) * \left(\frac{Y'}{4095}\right)^{2.6} \quad (5)$$

$$Z = \left(\frac{52.37}{48}\right) * \left(\frac{Z'}{4095}\right)^{2.6} \quad (6)$$

SMPTE 431-2 also gives the X'Y'Z' code values that define the white point of the system. These code values are [3794 3960 3890]. From these code values and Equations 4-6, one can calculate that the normalized XYZ values of the calibration white are [0.8946 1.0000 0.9547]. The absolute XYZ values would be [42.94 48.00 45.83]. Therefore, one can quickly and easily measure the white luminance of a projector in the theater by sending the code values [3794 3960 3890] to the projector and measuring the luminance of the light reflected by the screen. This is referred to herein as the measured white luminance Lm. The luminance can be measured with any device that will measure the absolute luminance, such as a light meter. This measurement is well known in the industry because this is the common method by which a display device is calibrated at the time of setting the device up in a theater. If the measured luminance is different from 48 nits, then an algorithm is defined based on the relationship between the measured luminance and the standardized luminance, in this case, 48 nits. The following paragraphs describe the algorithm that is used.

From the X'Y'Z' code values that define each pixel of the original display device image, the corresponding XYZ values are calculated from Equations 4-6. Then from the XYZ values, one calculates the L*, u', and v' values $$L^* = 116*(Y/Y_n)^{1/3} - 16 \quad \text{if } Y/Y_n > 0.008856 \quad (7)$$

$$L^* = 903.3*(Y/Y_n) \quad \text{if } Y/Y_n = < 0.008856 \quad (8)$$

$$u' = 4X/(X+15Y+3Z) \quad (9)$$

$$v' = 9X/(X+15Y+3Z) \quad (10)$$

In all of the equations, the subscript n indicates the values for the white. From u' and v' one calculates u*, v*, and C*

$$u^* = 13*L^{**}(u-u_n) \quad (11)$$

$$v^* = 13*L^{**}(v'-v'_n) \quad (12)$$

$$C^* = (u^{*2}+v^{*2})^{0.5} \quad (13)$$

Finally, colorfulness, M, is given by $$M = L^{1/6}*C^* \quad (14)$$

Equation 14 represents one mathematical notation for colorfulness; however, colorfulness may be mathematically represented by similar equations such as colorfulness as defined in The Reproduction of Colour by Dr. R. W. G. Hunt, 5th Edition, page 738.

From Equation 14 and remembering that the standard luminance of the white is Ls and the measured luminance of the white is Lm, one can write $$M_m = L_m^{1/6} * C_m^* \quad (15)$$

$$M_s = L_s^{1/6} * C_s^* \quad (16)$$

where $M_m$ indicates the colorfulness of a pixel based on the measured luminance and $M_s$ indicates the colorfulness of a pixel based on the standard luminance. Given the X'Y'Z' code values for each pixel of an image encoded as defined by the SMPTE standard 428-1, one can calculate both the colorfulness based on the measured luminance, $M_m$, and based on the standard luminance, $M_s$, using the above equations. If the luminance of the white is measured as 48 nits, the projected image will be as it was intended to be seen. However, if the luminance of the white is measured to be different from 48 nits, the image quality will be less than optimum.

The image quality of the image projected at a luminance different from the standard luminance can be improved if the colorfulness of the image projected at the non-standard while luminance is displayed at the same colorfulness as the image displayed at the standard white luminance. This means $M_m$, the colorfulness under the measured viewing conditions, must be adjusted such that it matches $M_s$, the colorfulness under the standard viewing conditions. Mathematically this can be expressed as $$M_m = M_s \quad (17)$$

Because $L_m$ is different from $L_s$, $C_m^*$ will need to be adjusted so that equality in colorfulness can be restored. This adjusted $C^*$ will be given the symbol $C_a^*$ and in the following equations, the subscript "a" will indicate the adjusted values and the subscript "s" will indicate the standard values.

From Equations 14 and 17, $$L_m^{1/6} * C_a^* = M_s \quad (18)$$

Rearranging gives $$C_a^* = M_s / L_m^{1/6} \quad (19)$$

The adjustment given by Equation 19 may either increase or decrease the original chroma.

Combining Equations 16 and 19 gives $$C_a^* = \left(\frac{L_s}{L_m}\right)^{1/6} * C_s^* \quad (20)$$

From Equations 13 and 20, one obtains $$u_a^* = \left(\frac{L_s}{L_m}\right)^{1/6} * u_s^* \quad (21)$$

$$v_a^* = \left(\frac{L_s}{L_m}\right)^{1/6} * v_s^* \quad (22)$$

From Equations 11, 21, 12, and 22, one obtains $$u_a' = \frac{u_a^*}{13 * L^*} + u_n' \quad (23)$$

$$v_a' = \frac{v_a^*}{13 * L^*} + v_n' \quad (24)$$

Because L* is calculated relative to the Y of the white as shown in Equations 7 and 8, the L* value will be unchanged by this adjustment to the $C_a^*$. From Equations 7 and 8, it can be seen that the adjusted Y value, Ya, will also be the same as the Y derived from Equation 5. By combining Equations 9, 11, and 21 and Equations 10, 12, and 22, and by eliminating the variable Xa, the following equation can be derived for the adjusted value Z, Za:

$$Z_a = \frac{9Y_a(4 - u_a') - 15Y_a v_a'(4 - u_a') - 15Y_a u_a' v_a'}{3(u_a' v_a' + v_a'(4 - u_a'))} \quad (25)$$

Likewise by combining Equations 10, 12, and 22 and rearranging, the following equation can be derived for the adjusted value X, Xa:

$$X_a = \frac{9Y_a}{v_a'} - 15Y_a - 3Z_a \quad (26)$$

Finally XaYaZa can be converted to Xa'Ya'Za' with Equations 1-3. Using this algorithm to transform all the X'Y'Z' code values for the starting image to the transformed code values Xa'Ya'Za', which are new pixel values, when sent to a digital projector, will produce a higher quality image when the measured white luminance is different from the standard white luminance.

Equation 20 was derived assuming full correction of the colorfulness based on the difference between the measured luminance and the standard luminance. There are some cases in which the image quality can be improved, but only a partial correction of the colorfulness is made. In this case, Equation 20 can be modified by the addition of a scale factor, α

$$C_a^* = \left(\alpha * \frac{L_s}{L_m}\right)^{1/6} * C_s^* \quad (20a)$$

where α has the following possible values $$\frac{L_m}{L_s} < \alpha \le 1 \quad \text{if } Lm < Ls \quad (20b)$$

$$\frac{L_m}{L_s} > \alpha \ge 1 \quad \text{if } Lm < Ls \quad (20c)$$

Equations 21 and 22 become $$u_a^* = \left(\alpha * \frac{L_s}{L_m}\right)^{1/6} * u_s^* \quad (21a)$$

$$v_a^* = \left(\alpha * \frac{L_s}{L_m}\right)^{1/6} * v_s^* \quad (22a)$$

The other equations are the same because they all depend on $u_a^*$ and $v_a^*$.

In an actual projector, the calculation of the adjusted X, Y, and Z values using the above series of equations for each pixel may take too long relative to the rate at which pixels are displayed on the screen. In this case, a three-dimensional look up table (3D LUT) may be calculated based on the measured La value. This 3D LUT can be stored for use when needed.

The 3D LUT can be loaded into an image-processing device, either inside the actual display device or separate from the display device. Then each set of code values for each pixel can be processed through the 3D LUT before the pixel is displayed. There are software or hardware methods to process pixels of color information through a 3D LUT at the speeds needed in a digital projector.

The measurement of the white luminance put out by a projector in a theater could be done on a daily, or weekly, or monthly basis and the 3D LUT can be calculated based on that measurement. Then that 3D LUT can be stored on the projector and the image data processed through that 3D LUT as the movie is being shown.

Likewise, the 3D LUT could be stored on a separate computer and the image data could be processed through that 3D LUT on that separate computer before being passed to the projector.

EXAMPLES

The color transforming method of the present invention will now be described more specifically with reference to the following examples.

Example 1

The starting point for the transform is the calibration white point for the SMPTE Digital Cinema system. The standard luminance for the white is 48 nits. The original display device X'Y'Z' code values for this white point are [3794 3960 3890]. Using Equations 4-6, we can calculate that the relative XYZ values of this calibration white point are:

$$X = \left(\frac{52.37}{48}\right) * \left(\frac{3794}{4095}\right)^{2.6} = 1.0910 * 0.8200 = 0.8946 \quad (27)$$

$$Y = \left(\frac{52.37}{48}\right) * \left(\frac{3960}{4095}\right)^{2.6} = 1.0910 * 0.9165 = 1.0000 \quad (28)$$

$$Z = \left(\frac{52.37}{48}\right) * \left(\frac{Z'}{4095}\right)^{2.6} = 1.0910 * 0.8750 = 0.9546 \quad (29)$$

$$u'_n = 4X/(X+15Y+3Z) = \quad (30)$$
$$4*0.8946/(0.8946+15*1+3*0.9546) = 0.1908$$

$$v'_n = \quad (31)$$
$$9Y/(X+15Y+3Z) = 9*1/(0.8946+15*1+3*0.9546) = 0.4798$$

Now assume that the measured luminance of the projector is only 24 nits. Consider the mid-gray color specified by SMPTE 431-2 as having display device code values [1897 1980 1945]. Using the equations from above, it can be calculated that $$XYZ = [0.1476\ 0.1649\ 0.1575] \quad (32)$$

$$u'v' = [0.1908\ 0.4798]$$

$$L^*u^*v^* = [47.62\ 0.0\ 0.0] \quad (33)$$

$$C_s^* = (u^{*2} + v^{*2})^{0.5} = (0.0^2 + 0.0^2)^{0.5} = 0.0 \quad (34)$$

$$C_n^* = \left(\frac{L_s}{L_m}\right)^{1/6} * C_s^* = \left(\frac{48}{24}\right)^{1/6} * 0.0 = 0.0 \quad (35)$$

In this example, because $C_a^*$ and $C_s^*$ are equal, there is no adjustment to the original display device image code values and the transform gives for the output image the display device code values [1897 1980 1945]. The reason no adjustment is needed is that the color in this example is gray and gray has 0 colorfulness. Hence no adjustment to colorfulness is needed.

Example 2

Because the white point values calculated in Example 1 are the same values needed for the calculations for all pixel values, they will be used in this example without recalculating them. Again assume that the measured luminance of the projector is only 24 nits. Assume a set of display device code values that are [2500 2000 1000]. This is a reddish color. The algorithm calculations follow as shown below $$XYZ = [0.3024\ 0.1693\ 0.0279] \quad (36)$$

$$u'v' = [0.4135\ 0.5208] \quad (37)$$

$$L^*u^*v^* = [48.17\ 139.47\ 25.69] \quad (38)$$

$$C_s^* = (u^{*2} + v^{*2})^{0.5} = (139.47^2 + 25.69^2)^{0.5} = 141.82 \quad (39)$$

$$C_a^* = \left(\frac{L_s}{L_m}\right)^{1/6} * C_s^* = \left(\frac{48}{24}\right)^{1/6} * 141.82 = 159.18 \quad (40)$$

$$u_a^* = \left(\frac{L_s}{L_m}\right)^{1/6} * u_s^* = \left(\frac{48}{24}\right)^{1/6} * 139.47 = 156.55 \quad (41)$$

$$v_a^* = \left(\frac{L_s}{L_m}\right)^{1/6} * v_s^* = \left(\frac{48}{24}\right)^{1/6} * 25.69 = 28.83 \quad (42)$$

$$u'_a = \frac{u_a^*}{13*L^*} + u'_n = \frac{156.55}{13*48.17} + 0.1908 = 0.4408 \quad (43)$$

$$v'_a = \frac{v_a^*}{13*L^*} + v'_n = \frac{28.83}{13*48.17} + 0.4798 = 0.5258 \quad (44)$$

$$[X_a\ Y_a\ Z_a] = [0.3193\ 0.1693\ 0.0130] \quad (45)$$

$$[X'_a\ Y'_a\ Z'_a] = [2553\ 2000\ 745] \quad (46)$$

In summary, for this example, the original display device X'Y'Z' code values of [2500 2000 1000] must be adjusted to [2553 2000 745] because the measured luminance was 24 nits instead of the standard 48 nits.

Example 3

In this example assume that the measured luminance of the projector is 60 nits. Assume the same set of original display device code values that were assumed in Example 2, [2500 2000 1000]. This is a reddish color. The algorithm calculations follow as shown below $$XYZ = [0.3024\ 0.1693\ 0.0279] \quad (47)$$

$$u'v' = [0.4135\ 0.5208] \quad (48)$$

$$L^*u^*v^* = [48.17\ 139.47\ 25.69] \quad (49)$$

$$C_s^* = (u^{*2} + v^{*2})^{0.5} = (139.47^2 + 25.69^2)^{0.5} = 141.82 \quad (50)$$

$$C_a^* = \left(\frac{L_s}{L_m}\right)^{1/6} * C_s^* = \left(\frac{48}{60}\right)^{1/6} * 141.82 = 136.64 \quad (51)$$

-continued $$u_a^* = \left(\frac{L_s}{L_m}\right)^{1/6} * u_s^* = \left(\frac{48}{60}\right)^{1/6} * 139.47 = 134.38 \quad (52)$$

$$v_a^* = \left(\frac{L_s}{L_m}\right)^{1/6} * v_s^* = \left(\frac{48}{60}\right)^{1/6} * 25.69 = 24.75 \quad (53)$$

$$u_a' = \frac{u_a^*}{13*L^*} + u_n' = \frac{134.38}{13*48.17} + 0.1908 = 0.4054 \quad (54)$$

$$v_a' = \frac{v_a^*}{13*L^*} + v_n' = \frac{24.75}{13*48.17} + 0.4798 = 0.5193 \quad (55)$$

$$[X_a \quad Y_a \quad Z_a] = [0.2973 \quad 0.1693 \quad 0.0324] \quad (56)$$

$$[X_a' \quad Y_a' \quad Z_a'] = [2484 \quad 2000 \quad 1059] \quad (57)$$

In summary, for this example, the original display device X'Y'Z' code values of [2500 2000 1000] must be adjusted to [2484 2000 1059] because the measured luminance was 60 nits instead of the standard 48 nits.

Example 4

In this example, the same conditions as Example 2 will be assumed, but only a partial correction of the colorfulness will be calculated. As in Example 2 assume that the measured luminance of the projector is only 24 nits. Assume a set of original display device code values that are [2500 2000 1000]. This is a reddish color. The algorithm calculations follow as shown below $$XYZ = [0.3024 \quad 0.1693 \quad 0.0279] \quad (36)$$

$$u'v' = [0.4135 \quad 0.5208] \quad (58)$$

$$L^*u^*v^* = [48.17 \quad 139.47 \quad 25.69] \quad (59)$$

$$C_s^* = (u^{*2} + v^{*2})^{0.5} = (139.47^2 + 25.69^2)^{0.5} = 141.82 \quad (60)$$

$$C_a^* = \left(\frac{L_s}{L_m}\right)^{1/6} * C_s^* = \left(\frac{48}{24}\right)^{1/6} * 141.82 = 159.18 \quad (61)$$

From Equation 20b, α must fall in the range $$\frac{L_m}{L_s} = \frac{24}{48} = 0.50 < \alpha \leq 1 \quad (62)$$

assume α is 0.80. Then using Equations 21a and 22a instead of 21 and 22

$$u_a^* = \left(0.80 * \frac{L_s}{L_m}\right)^{1/6} * u_s^* = \left(0.80 * \frac{48}{24}\right)^{1/6} * 139.47 = 150.83 \quad (63)$$

$$v_a^* = \left(0.80 * \frac{L_s}{L_m}\right)^{1/6} * v_s^* = \left(0.80 * \frac{48}{24}\right)^{1/6} * 25.69 = 27.78 \quad (64)$$

The calculations are now the same as Equations 43-46, but the $u_a^*$ and $v_a^*$ from Equations 63 and 64 are used.

$$u_a' = \frac{u_a^*}{13*L^*} + u_n' = \frac{150.83}{13*48.17} + 0.1908 = 0.4317 \quad (65)$$

$$v_a' = \frac{v_a^*}{13*L^*} + v_n' = \frac{150.83}{13*48.17} + 0.4798 = 0.5242 \quad (66)$$

$$[X_a \quad Y_a \quad Z_a] = [0.3137 \quad 0.1693 \quad 0.0179] \quad (67)$$

$$[X_a' \quad Y_a' \quad Z_a'] = [2535 \quad 2000 \quad 843] \quad (68)$$

In summary, for this example, the original display device X'Y'Z' code values of [2500 2000 1000] must be adjusted to [2535 2000 843] because the measured luminance was 24 nits instead of the standard 48 nits and α is set to 0.80. Because in this example only a partial correction to the colorfulness was made, the adjusted display device X'Y'Z' code values fall between the original display device X'Y'Z' code values, [2500 2000 1000], and the adjusted display device X'Y'Z' code values from Example 2, [2553 2000 745].

Referring to FIG. 1, there is shown a computer system 10 for implementing the present invention. There is shown a microprocessor-based unit 20 for processing algorithms, software programs or firmware programs and the like. It is also well known that electronic circuitry may be used instead of the algorithms, software programs and firmware to implement the present invention. In the present invention, the algorithm for converting original display device pixel values to new pixel values will be calculated. There is also a monitor 30 for viewing display outputs of the algorithms. There is also a CD reader 40 connected to the microprocessor-based unit 20 that receives a CD 50 for reading algorithms and software programs. The algorithms and software programs may also be input via a disk 60. In the present invention, the microprocessor-based unit 20 receives the original display device pixel values and outputs new pixel values that maintain colorfulness.

The computer system 10 also includes a keyboard 70 for inputting data to the algorithms, software programs and firmware programs. A mouse 80 is used alternatively or in conjunction with the keyboard for inputting data.

Figure 2:
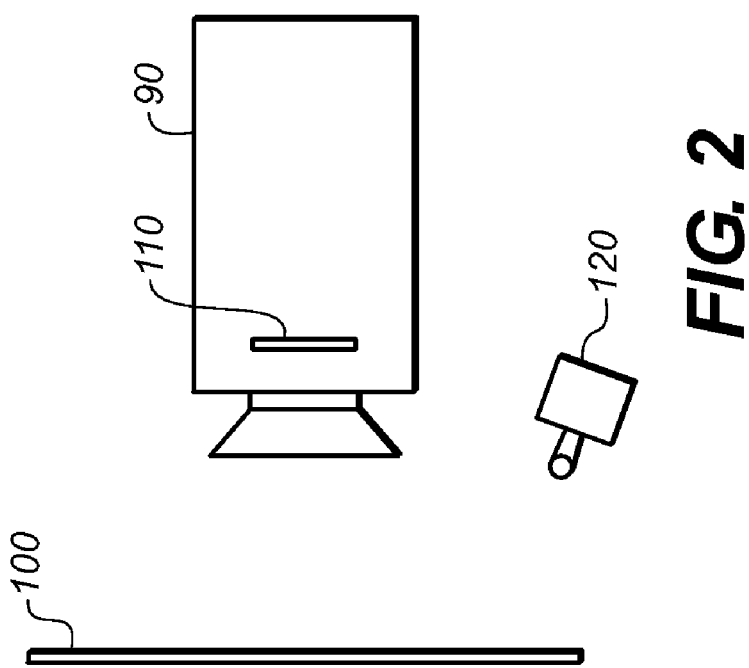
FIG. 2 illustrates a digital projector for displaying movies on a view surface of the present invention.

Referring to FIG. 2, there is shown a digital projector 90 for displaying movies on a viewing surface 100, such as a movie screen. Although the present invention preferably contemplates a movie screen 100, the viewing surface 100 may be a computer monitor, for example, used for editing pre-release versions of a movie. The viewing surface may also be a television screen for using the present invention in a home environment. The digital projector 90 may include a look-up-table or LUT 110 that stores a plurality of input pixel values with corresponding new pixel values that were calculated by the computer system using the algorithm of the present invention. These new pixel values are then used by the display device to produce light that is displayed on the screen 100 for visual display.

There is also shown a light meter 120 for measuring the white luminance of the viewing surface.

Figure 3:
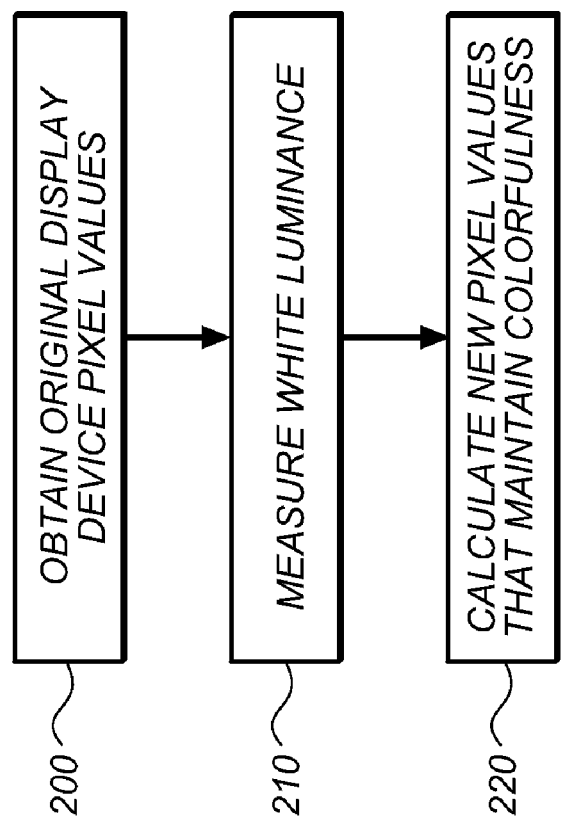
FIG. 3 illustrates a flowchart summarizing a preferred embodiment of the present invention.

FIG. 3 shows a flowchart summarizing a preferred embodiment of the present invention. The method includes an obtain original display device pixel values step 200, a measure white luminance step 210 and a calculate new pixel values that maintain colorfulness 220. Detailed descriptions for each of these steps are described above.

While the basic features of the color transforming method according to this invention have been described above, it should be noted that these are not the sole cases of the invention and various improvements and design modifications may be made without departing from the scope and spirit of the invention.

PARTS LIST 10 computer system
20 microprocessor-based unit
30 monitor
40 CD reader
50 CD
60 disk
70 keyboard
80 mouse
90 digital projector
100 viewing surface/movie screen
110 look-up-table (LUT)
120 light meter
200 obtain original display device pixel values step
210 measure white luminance sten
220 calculate new pixel values that maintain colorfulness step

I claim:

1. A method for modifying original display device pixel values to maintain colorfulness, the method comprising the steps of:
    (a) obtaining original display device pixel values of an input image;
    (b) using a display device to display a white patch having white point code values on a viewing surface and measuring a white luminance from the viewing surface; and
    (c) using a microprocessor to calculate modified pixel values for a modified image based on the original display device pixel values, the measured white luminance and a standard white luminance, wherein the new pixel values produce substantially the same colorfulness when displayed on the viewing surface using the display device that would be produced if the original display device pixel values were displayed on a reference display device that produces the standard white luminance for a white patch having the white point code values.

2. The method as in claim 1 wherein the display device is a digital projector.

3. The method as in claim 1 further comprising the step of using the display device to display the modified image on the viewing surface.

4. The method claimed in claim 1 further comprising the step of creating a three-dimensional look-up table with the original display device pixel values as input and the modified pixel values as output.

5. The method as in claim 1 further comprising the step of providing SMPTE standard white luminance as the standard white luminance.

6. The method claimed in claim 1, wherein step (c) includes computing modified chroma values for the new pixel values using the equation:

$$C^*_a = Ms/L_m^{1/6}$$

where Ms is the colorfulness that the original display device pixel values would have if they were displayed on the reference display device, $L_m$ is the measured luminance, and $C^*_a$ is the modified chroma values for the new pixel values.

7. The method claimed in claim 1 further comprising the step of using a light meter for measuring white luminance in step (b).

8. The method claimed in claim 6, wherein the modified chroma values $C^*_a$ are either decreased or increased from original chroma values associated with the original display device pixel values.

9. A non-transitory tangible computer-readable storage medium having computer-readable instructions thereon, which when executed by a programmable device, causes the programmable device to execute the steps of:
    (a) receiving original display device pixel values of an input image;
    (b) receiving a measured white luminance for a display device corresponding to white point code values; and
    (c) calculating new pixel values based on the original display device pixel values, the measured white luminance and a standard white luminance, wherein the new pixel values produce substantially the same colorfulness when displayed using the display device that would be produced if the original display device pixel values were displayed on a reference display device that produces the standard white luminance.

10. The non-transitory tangible computer-readable storage medium as in claim 9 further comprising the step of:
    (d) displaying the new pixel values using the display device.

11. The non-transitory tangible computer-readable storage medium in claim 9 further comprising the step of providing SMPTE standard white luminance as the standard white luminance.

12. The non-transitory tangible computer-readable storage medium as in claim 9, wherein step (c) includes computing modified chroma values for the new pixel values using the equation:

$$C^*_a = Ms/L_m^{1/6}$$

where Ms is the colorfulness that the original display device pixel values would have if they were displayed on the reference display device, $L_m$ is the measured luminance, and $C^*_a$ is the modified chroma values for the new pixel values.

13. A computer that receives original display device pixel values of an image to be displayed on a viewing surface using a display device and a measured white luminance from the viewing surface and that modifies the original display device pixel values to calculate new pixel values that maintain colorfulness, the computer comprises:
    (a) a microprocessor;
    (b) a non-transitory tangible computer-readable storage medium storing instructions for causing the microprocessor to calculate new pixel values based on the original display device pixel values, the measured luminance and a standard white luminance to maintain colorfulness, wherein the new pixel values produce substantially the same colorfulness when displayed using the display device that would be produced if the original display device pixel values were displayed on a reference display device that produces the standard white luminance.

14. A method for modifying original display device pixel values of an input image for changing colorfulness of the input image, the method comprising the steps of:
    (a) obtaining original display device pixel values of an input image;
    (b) using a display device to display a white patch having white point code values on a viewing surface and measuring a white luminance from the viewing surface; and
    (c) using a microprocessor to calculate modified pixel values for a modified image having a changed colorfulness based on the original display device pixel values, the measured white luminance and a standard white luminance, wherein the modification of the pixel values partially corrects for a difference between a colorfulness of the input image when displayed on the display device and a colorfulness of the input image when displayed on a reference display device that produces the standard white luminance.

15. The method as in claim 14 wherein the display device is a digital projector.

16. The method as in claim 14 further comprising the step of using the display device to display the modified image on the viewing surface.

17. The method claimed in claim 14 further comprising the step of creating a three-dimensional look-up table with the original display device pixel values as input and the modified pixel values as output.

18. The method as in claim 14 further comprising the step of providing SMPTE standard white luminance as the standard white luminance.

19. The method claimed in claim 14, wherein step (c) includes computing modified chroma values for the new pixel values using the equation:

$$C^*_a = \alpha Ms/L_m^{1/6}$$

where Ms is the colorfulness that the original display device pixel values would have if they were displayed on the reference display device, $L_m$ is the measured luminance, $\alpha$ is a partial correction factor, and $C^*_a$ is the modified chroma values for the new pixel values.

20. The method claimed in claim 14 further comprising the step of using a light meter for measuring white luminance in step (b).

21. The method claimed in claim 19, wherein the modified chroma values $C^*_a$ are either decreased or increased from the original chroma values associated with the original display device pixel values.

* * * * *